United States Patent
Eide et al.

(10) Patent No.: US 8,523,540 B2
(45) Date of Patent: Sep. 3, 2013

(54) FLUID PUMP SYSTEM

(75) Inventors: Jørgen Eide, Fana (NO); Aage Hadler-Jacobsen, Nesttun (NO)

(73) Assignee: Framo Engineering AS, Sandsli, Bergen (NO)

( * ) Notice: Subject to any disclaimer, the term of this patent is extended or adjusted under 35 U.S.C. 154(b) by 257 days.

(21) Appl. No.: 12/595,486

(22) PCT Filed: Apr. 3, 2008

(86) PCT No.: PCT/NO2008/000124
§ 371 (c)(1),
(2), (4) Date: Feb. 4, 2010

(87) PCT Pub. No.: WO2008/127119
PCT Pub. Date: Oct. 23, 2008

(65) Prior Publication Data
US 2010/0129237 A1  May 27, 2010

(30) Foreign Application Priority Data

Apr. 12, 2007 (NO) .................................. 20071861

(51) Int. Cl.
*F04D 13/06* (2006.01)
*F04D 29/58* (2006.01)
*H02K 5/132* (2006.01)
*H02K 9/197* (2006.01)

(52) U.S. Cl.
USPC .......... 417/423.8; 417/423.5; 310/52; 310/54

(58) Field of Classification Search
USPC .................. 417/423.8, 423.5; 310/54, 52, 90
See application file for complete search history.

(56) References Cited

U.S. PATENT DOCUMENTS

| | | | | |
|---|---|---|---|---|
| 1,269,909 | A | * 6/1918 | Cooper | 310/86 |
| 2,913,988 | A | * 11/1959 | White | 417/357 |
| 3,078,805 | A | 2/1963 | Pezzillo | |
| 6,264,448 | B1 | * 7/2001 | Itoh et al. | 418/104 |
| 6,655,932 | B1 | * 12/2003 | Stinessen et al. | 417/423.1 |
| 7,156,627 | B2 | * 1/2007 | Lenderink et al. | 417/423.8 |
| 2005/0214141 | A1 | * 9/2005 | Huster et al. | 417/423.8 |
| 2006/0292019 | A1 | * 12/2006 | Bode et al. | 417/423.7 |

FOREIGN PATENT DOCUMENTS

| | | |
|---|---|---|
| DE | 1 528 876 | 4/1964 |
| DE | 1 167 966 | 10/1969 |
| GB | 743779 | 1/1956 |

* cited by examiner

*Primary Examiner* — Peter J Bertheaud
*Assistant Examiner* — Dominick L Plakkoottam
(74) *Attorney, Agent, or Firm* — Merchant & Gould P.C.

(57) ABSTRACT

A fluid pump system comprises an electrical drive unit and a rotary pump comprising a rotatable shaft and a drive element formed from a number of impellers attached to the shaft for causing flow within a process fluid. The electrical drive unit comprises an electrical stator and an electrical rotor attached to the shaft via a coupling, the electrical stator being disposed adjacent to the electrical rotor. The electrical stator is disposed within a first casing and the rotary pump and the electrical rotor are disposed within a second casing. The first casing contains a first fluid and the second casing contains a second fluid.

10 Claims, 1 Drawing Sheet

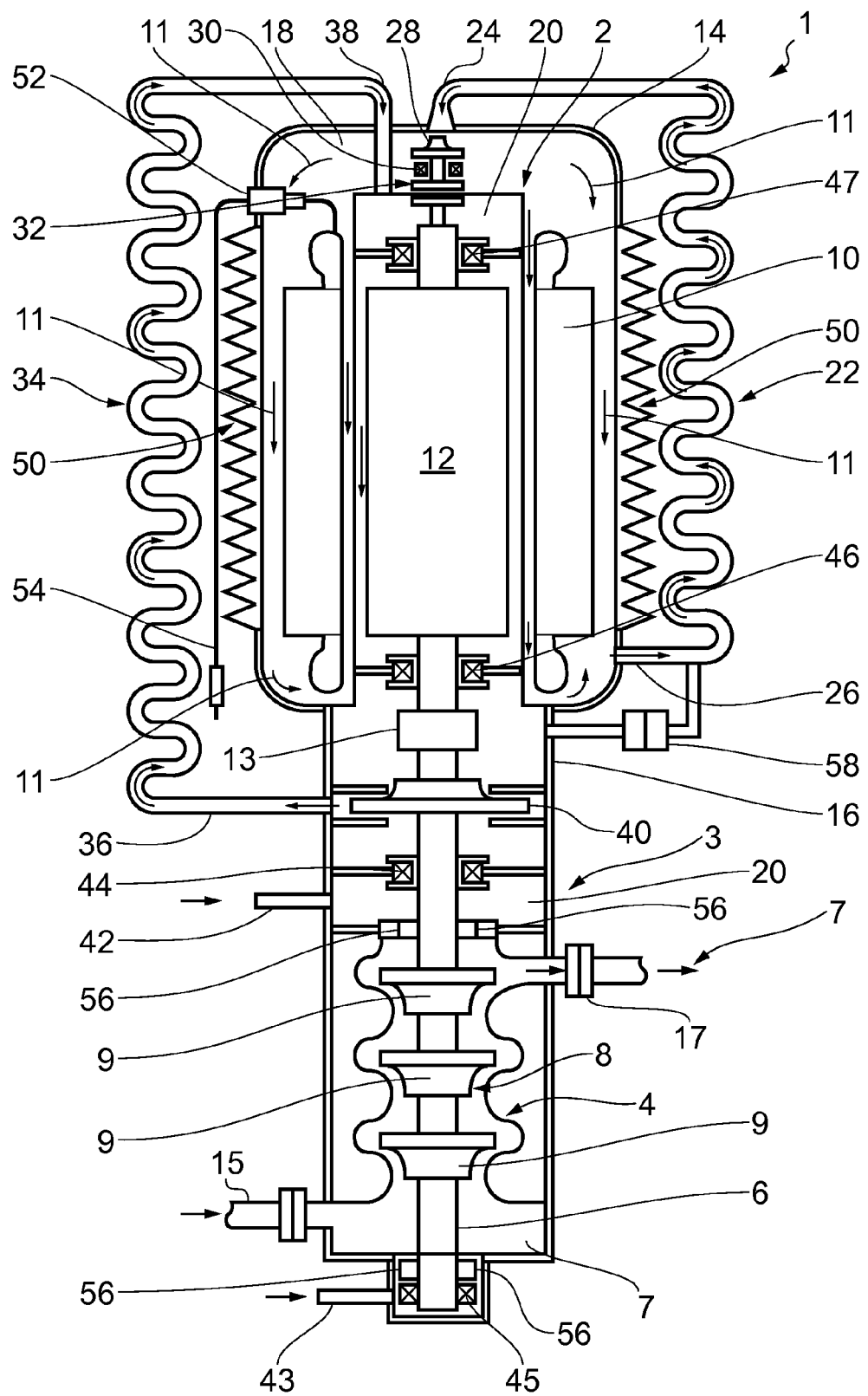

FLUID PUMP SYSTEM

The present invention relates to a fluid pump system and is concerned practically with a fluid pump system comprising an electrical drive unit and a rotary pump suitable for use submerged in sea water.

BACKGROUND OF THE INVENTION

When using electrically driven pumps there is a need to provide a system that is environmentally friendly with no or minimum leakages to the environment, where one at the same time would like to use as optimized fluids in the different elements of the fluid pump system as possible. There is also a need for a system where one may use conventional, proven stator, electric connections and penetrator design in electrical parts. There is also a need for such a pump system that may be utilized subsea. The present invention gives a solution to these needs.

DISCLOSURE OF THE INVENTION

According to a first aspect of the present invention there is provided a fluid pump system comprising an electrical drive unit and a rotary pump comprising a rotatable shaft and a drive element attached to the shaft for causing flow within a process fluid; the electrical drive unit comprising an electrical stator and an electrical rotor attached to the shaft; the electrical stator being disposed within a first casing and the rotary pump and the electrical rotor being disposed within a second casing; wherein the first casing contains a first fluid and the second casing contains a second fluid and the arrangement being such that the electrical stator is disposed adjacent to the electrical rotor.

One aspect of the present invention is to provide a fluid pump system that is designed to be able to utilize the benefits of a canned electric motor stator section, which is filled with an oil that is optimized to protect electrical parts in a pump that is submerged in sea water, while the oil that is used to lubricate the bearings and mechanical seals is based on an environmental friendly lubricant, a so-called green fluid.

Preferably, the first casing contains an environmentally friendly fluid and the second casing contains a second environmentally friendly coolant and lubricant fluid, and where the different fluids may be optimized for different functions. The fluid in the second casing may in some applications be based on the process fluid, when this may be treated to remove unwanted substances from the process fluid as for instance solid particle.

The rotary pump system may comprise a first external fluid cooling circuit comprising an inlet section connected to the first casing, and an outlet section connected to the first casing; and means for causing the flow of fluid from within the first casing through the first external cooling circuit.

The rotary pump system may comprise a second external fluid cooling circuit comprising a inlet section connected to the second casing and an outlet section connected to the second casing; and means for causing the flow of fluid from within the second casing through the second external cooling circuit.

The first casing may comprise static seals for the interfaces between the internal region of the first casing and the external environment. The fluid oil inside the first casing is preferably enclosed in a pressure tight enclosure with no rotating seals. The fluid oil inside the stator is intended to be filled before installation and then permanently sealed off.

Preferably, the second casing comprises static seals for the interfaces between the internal region of the second casing and the external environment. Both the pump and motor sections are enclosed inside pressure casings, which can be subjected to pipeline shut-in pressure (typically 345 bar) with no rotating seals, only static seals to the environment.

The fluid pump system preferably comprises a fluid balance chamber for substantially maintaining equal pressure in the first casing and the second casing. The fluid oil inside the first casing and the stator is pressurized to the same pressure as the fluid oil inside the second casing by means of the pressure balance chamber. The chamber is sized to cater for thermal expansion of the fluid within the enclosed first chamber around the stator as the stator is heated up during operation as well as compression of the oil with increasing operating pressure. The pressure differential between the oil and the green lubricant is kept substantially close to zero. The second chamber may be equipped with a control system for controlling the pressure within the second chamber.

According to one aspect of the invention one section of the first casing may form a section of the second casing, thereby forming a common barrier defining sections of both casings. This arrangement may be favorable when the stator is arranged on the outside of the rotor, surrounding it, with the common barrier between the casings arranged in between the stator and the rotor. This section of the casings forming the common barrier may be manufactured by a non-magnetic material. According to another aspect the system may be formed with separate casings of a non-magnetic material in the region between the rotor and the stator. The rotor or a coating on the rotor may in one aspect of the invention also form a part of the casing around the rotor, and thereby also possibly form a section of both the casings.

The motor in question used in a device according to the invention may be an asynchronous motor or possibly a synchronous motor with permanent magnets arranged on the rotor.

BRIEF DESCRIPTION OF THE DRAWING

A specific embodiment of the invention will now be described by way of example only with reference to the accompanying drawing, in which:

FIG. 1 is a schematic vertical cross-sectional view of a fluid pump system according the present invention.

With reference to the FIG. 1, there is shown a fluid pump system 1 comprising a an electrical drive unit 2 and a rotary pump 4 comprising a rotatable shaft 6 and a drive element 8 formed from three impellers 9 attached to the shaft 6 for causing flow within a process fluid 7. The drive element 8 may of course comprise less or more impellers 9. The electrical drive unit 2 comprises an electrical stator 10 and an electrical rotor 12 attached to the shaft 6 via a coupling 13, the electrical stator 10 being disposed adjacent to the electrical rotor 12 and in the embodiment shown arranged around the electrical rotor 12, surrounding the electric rotor 12. The electrical stator 10 is disposed within a first casing 14 and the rotary pump 4 and the electrical rotor 12 are disposed within a second casing 16. The first casing 14 contains a first fluid 18 and the second casing 16 contains a second fluid 20. The first fluid 18 in the first casing 14 is isolated from the second fluid 20 in the second casing 16. The process fluid 7 enters the drive element 8 through an inlet port 15 and exits the drive element 8 through an outlet port 17. The circulation of the first fluid 18 within the first casing 14 is shown by a series of arrows 11. The flow of the fluid 18 is generally from the upper region of the casing 14 to the lower region of the casing 14, as shown in the figure. The upper region of the first casing 14 should be understood to be the region of the first casing faced away from the rotary pump. The relative term upper is referring to the figure and not necessary to the installation of the fluid pump system in use.

The fluid pump system is provided with a first external fluid cooling circuit 22 comprising an inlet section 24 connected to an upper region of the first casing 14 and an outlet section 26 connected to a lower region of the first casing; and means for causing the flow of fluid from within the first casing through the first external cooling circuit. The fluid 18 within the first casing 14 is driven through the cooling circuit 22 with the use of a rotatable impeller 28 mounted on a bearing unit 30 and obtaining rotational force from the shaft 6 via a magnetic coupling arrangement 32.

There is also provided a second external fluid cooling circuit 34 comprising an outlet section 36 connected to an intermediate region of the second casing 16 and an inlet section 38 connected to an upper region of the second casing 16 and an impeller 40 attached to the shaft 6 for causing the flow of fluid 20 from within the second casing 16 through the second external cooling circuit 34. An upper region of the second casing 16 is positioned close to the upper region of the first casing 14.

Disposed each side of the drive element 8 there are respective bearing units 44, 45 for the shaft 6 and disposed each side of the rotor 12 there are respective bearing units 46, 47.

The second casing 16 is formed with a supply of oil fluid and preferably with two oil supply inlets 42, 43. One inlet 42 is disposed between the impeller 40 and the drive element 8 and the other inlet 43 is disposed at one end of the shaft 6 adjacent the bearing unit 45 for the shaft 6. In another embodiment there may be just one oil supply inlet to the second casing and with internal communication between the different regions of the second casing 16.

The outer surface of first casing 14 is formed with a series of cooling ribs 50. In some fluid pump systems there is with the arrangement of the cooling ribs 50 sufficient cooling of the fluid 18 within the first casing 14, so one may omit the first external cooling circuit 22 with the rotatable impeller 28 and the bearing unit 30. Electrical power is supplied to the stator 10 via an electric penetrator 52 that extends through the wall of the first casing 14 and is connected to an electrical supply line 54.

The oil fluid 18 for the stator 10 is enclosed in the pressure tight first casing 14 with no rotating seals. The oil fluid 18 inside the casing 14 is preferably intended to be filled before installation and then permanently sealed off.

Both the pump 4 and the electrical drive unit 2 are enclosed inside pressure casings 14, 16 and can be subjected to pipeline shut-in pressure (typically 345 bar) with no rotating seals, only static seals to the environment.

The bearings 46, 47 supporting the electrical rotor 12 and the pump shaft 6 with impellers 9 as well as mechanical seals 56 are lubricated and cooled by means of an environmental friendly lubricant oil fluid 20. Preferably, fluid 20 is a green fluid such as defined in an EU-directive, allowable to be released into the environment, but with the properties to provide lubrication and protection for the parts within the second chamber 16.

The oil pressure in the second casing 16 is preferably kept at about 15-20 bar above the process pressures by an external barrier oil supply system. The barrier oil supply system may be similar to systems supplied by Framo subsea pumps and not detailed further in this description. This ensures the bearing units 44, 45, 46, 47, the coupler 13 and the seals 56 are protected from pollution by the process fluid 7 (pollutants such as particles, water etc), and any potential leakage past the mechanical seals 56 are from within the casing 16 side to the process side.

The oil fluid 18 inside the first casing 14 and the stator 10 is pressurized to the same pressure as the fluid oil 20 in the second casing 16 by means of a pressure balance chamber 58. The chamber 58 is sized to cater for thermal expansion as the stator 10 is heated up during operation or due to pressure drops as well as compression of the oil fluid 18 with increasing operating pressure or when the motor is shut down and the fluid 20 is cooled down. The chamber 58 may either be a piston arrangement with sealing means, a rubber bellows or any kind of membrane separating the fluid but allowing pressure balancing between the fluids. The chamber 58 may be connected second casing 16 close to the impeller 40 and the first casing 14 close to the outlet section 26 of the first external cooling circuit. Such a pressure balance chamber may be positioned between the two casings 14,16 in a different manner. The pressure differential between the first fluid 18 and the second fluid 20 is preferably kept close to zero.

It will be appreciated that in the rotor and pump sections emission of potential environmental unfriendly barrier fluid into the process (in case of a multi phase pump and a processed water injection pump) or ambient (in case of a raw seawater injection pump) can be substantially eliminated.

The invention has now been explained with an embodiment, a skilled person will understand that there may be made several alterations and modifications to the described embodiment that are within the scope of the invention as defined in the attached claims.

The invention claimed is:

1. A fluid pump system comprising an electrical drive unit and a rotary pump comprising a rotatable shaft and a drive element attached to the shaft for causing flow within a process fluid; the electrical drive unit comprising an electrical stator and an electrical rotor attached to the shaft; the electrical stator being disposed within a first casing and the rotary pump and the electrical rotor being disposed within a second casing; wherein the first casing contains a first lubricant fluid and the second casing contains a second lubricant fluid sealed from the process fluid and the arrangement being such that the electrical stator is disposed adjacent to the electrical rotor, wherein the fluid pump system comprises a second external fluid cooling circuit comprising an inlet section connected to the second casing and an outlet section connected to the second casing; at least one second impeller causing a flow of the second lubricant fluid from within the second casing through the second external cooling circuit.

2. A fluid pump system as claimed in claim 1, wherein the first lubricant fluid is an environmentally friendly fluid.

3. A fluid pump system as claimed in claim 1, wherein the fluid pump system comprises a first external fluid cooling circuit comprising an inlet section connected to the first casing and an outlet section connected to the first casing; and at least one first impeller causing a flow of the first lubricant fluid from within the first casing through the first external cooling circuit.

4. A fluid pump system as claimed in claim 1, wherein the fluid pump system comprises a fluid balance chamber for substantially maintaining equal pressure between the first lubricant fluid in the first casing and the second lubricant fluid in the second casing.

5. A fluid pump system as claimed in claim 1, wherein the electrical rotor is arranged within the electrical stator, thereby surrounding the electrical rotor.

6. A fluid pump system as claimed in claim 1, wherein a section of the first casing forms a section of the second casing.

7. A fluid pump system as claimed in claim 6, wherein the section is made of a non-magnetic material and positioned between the electrical stator and the electrical rotor.

8. A fluid system as claimed in claim 1, wherein the first lubricant fluid is permanently sealed inside the first casing.

9. A fluid pump system as claimed in claim 1, wherein the second lubricant fluid is an environmentally friendly fluid.

10. A fluid pump system as claimed in claim 1, wherein the pressure of the second lubricant fluid in the second casing is higher than the pressure of the process fluid.

* * * * *

UNITED STATES PATENT AND TRADEMARK OFFICE
CERTIFICATE OF CORRECTION

PATENT NO. : 8,523,540 B2 Page 1 of 1
APPLICATION NO. : 12/595486
DATED : September 3, 2013
INVENTOR(S) : Eide et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Fifteenth Day of September, 2015

Michelle K. Lee
*Director of the United States Patent and Trademark Office*